US012762029B2

(12) United States Patent
Yoshioka et al.

(10) Patent No.: US 12,762,029 B2
(45) Date of Patent: Oct. 13, 2026

(54) ERROR RATE MEASUREMENT APPARATUS AND SIGNAL DETECTION METHOD

(71) Applicant: ANRITSU CORPORATION, Kanagawa (JP)

(72) Inventors: Hironori Yoshioka, Kanagawa (JP); Tatsuya Iwai, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 51 days.

(21) Appl. No.: 19/024,234

(22) Filed: Jan. 16, 2025

(65) Prior Publication Data

US 2025/0291688 A1 Sep. 18, 2025

(30) Foreign Application Priority Data

Mar. 15, 2024 (JP) ................................ 2024-041612

(51) Int. Cl.
*G06F 11/22* (2006.01)

(52) U.S. Cl.
CPC ................................. *G06F 11/221* (2013.01)

(58) Field of Classification Search
CPC ...... G06F 11/221; H04L 1/203; H04L 1/0056; H04L 43/045; H04L 43/50
See application file for complete search history.

(56) References Cited

U.S. PATENT DOCUMENTS 6,988,227 B1 * 1/2006 Perrott .................... H04L 1/205 714/704
12,442,856 B2 * 10/2025 Iwai .................. G01R 31/3171
12,442,857 B2 * 10/2025 Yoshioka ................ H04L 1/203
2016/0164501 A1 * 6/2016 Kong .................. H03K 21/026 327/198

FOREIGN PATENT DOCUMENTS

JP 7132964 B2 9/2022

OTHER PUBLICATIONS

L. Barford, "Sequential Bayesian bit error rate measurement," in IEEE Transactions on Instrumentation and Measurement, vol. 53, No. 4, pp. 947-954, Aug. 2004 (Year: 2004).*

* cited by examiner

*Primary Examiner* — Cynthia Britt
(74) *Attorney, Agent, or Firm* — McDonald Hopkins LLC

(57) ABSTRACT

There is provided an error rate measurement apparatus including: a display unit; a reference signal holding unit that holds a part of a head of the internal signal as a reference signal; a head detection unit that detects a head of the specific pattern in an input signal from the DUT by comparing the reference signal with the input signal; a detection signal output unit that outputs a detection signal synchronized with a timing at which the head of the specific pattern is detected by the head detection unit; a latch unit that holds the detection signal; and a control unit that displays a detection notification image indicating that the head of the specific pattern is detected by the head detection unit, on the display unit, during a period in which the detection signal is held by the latch unit.

10 Claims, 6 Drawing Sheets

ERROR RATE MEASUREMENT APPARATUS AND SIGNAL DETECTION METHOD

TECHNICAL FIELD

The present invention relates to an error rate measurement apparatus and a signal detection method, and particularly to an error rate measurement apparatus and a signal detection method for detecting a head of a pattern of an input signal.

BACKGROUND ART

In protocol such as Peripheral Component Interconnect Express (PCIe) (registered trademark) or Universal Serial Bus (USB) (registered trademark), a sequence operation of switching a state of a device by controlling a link state management mechanism (Link Training and Status State Machine (LTSSM)) is essential. By sending a plurality of prescribed data patterns (hereinafter, referred to as "sequence blocks") to the device in a correct order, it is possible to variously change the state of the device.

For example, PCIe has standards such as Gen1 to Gen6, and a communication speed also varies from 2.4 GT/s to 32 GT/s for each standard. All the PCIe devices have backward compatibility, and can switch the communication speed. The switching of the state is also used for switching of the communication speed.

For example, in the PCIe, a state transition diagram of the LTSSM is as illustrated in FIG. 6, and L0, L0s, L1, L2, Detect, Polling, Configuration, Disabled, Hot Reset, Loopback, and Recovery are defined as states.

A manufacturer that develops a PCIe device or a USB device, or a manufacturer that develops a controller of the PCIe device or the USB device needs to check whether or not the device can correctly transmit and receive a sequence block in a test at a time of device development. For this check, for example, a logic analyzer or a protocol analyzer is used. Meanwhile, many of these measurement apparatuses lack real-time performance, and cannot acquire and analyze data at the same time. Further, there is also a pattern having a very long cycle in the sequence block, and the analysis may take time in these measurement apparatuses.

As a measurement apparatus that can acquire and analyze data in real time, an error rate measurement apparatus is known (for example, see Patent Document 1).

RELATED ART DOCUMENT

Patent Document

[Patent Document 1] Japanese Patent No. 7132964

DISCLOSURE OF THE INVENTION

Problem that the Invention is to Solve

The device manufacturer needs to check whether the developed device performs a correct state transition according to an input sequence block. Since data output from the device is determined according to the state, the state of the device can be grasped by discriminating the data output from the device.

Meanwhile, although the existing error rate measurement apparatus can measure an error rate of continuous data, the existing error rate measurement apparatus does not have a mechanism for detecting instantaneous data of approximately 1 ms and notifying a user of the detection.

Since the error rate measurement apparatus does not perform a measurement of an error rate unless the data is detected, the user can ascertain that the data is detected based on whether or not the measurement of the error rate is performed. Meanwhile, since an update cycle of a graphical user interface (GUI) of the error rate measurement apparatus in the related art is approximately 100 ms, there is a problem in which the user cannot visually recognize a detection of data unless a length of the data is longer than or equal to several hundred ms. Further, even if the data has a length of hundreds of ms or more, in a case where the entire sequence takes a long time, it is not realistic for the user to check when a display for a period of hundreds of ms is to be performed.

The present invention has been made in order to solve such a problem in the related art, and an object of the present invention is to provide an error rate measurement apparatus and a signal detection method capable of detecting a specific pattern such as a sequence block in real time, and notifying a user of the detected specific pattern.

Means for Solving the Problem

In order to solve the above problem, there is provided an error rate measurement apparatus (100) for measuring an error rate of an input signal from a device under test (DUT) (200), the error rate measurement apparatus including: a display unit (40); an internal signal generation circuit (22) that generates an internal signal consisting of a specific pattern expected to be output from the DUT according to a state of a link state management mechanism; a reference signal holding unit (23) that holds a part of a head of the internal signal as a reference signal; a head detection unit (24) that detects a head of the specific pattern in the input signal by comparing the reference signal with the input signal; a detection signal output unit (25) that outputs a detection signal synchronized with a timing at which the head of the specific pattern is detected by the head detection unit; a latch unit (26) that holds the detection signal; and a control unit (42) that displays a detection notification image (61) indicating that the head of the specific pattern is detected by the head detection unit, on the display unit, during a period in which the detection signal is held by the latch unit.

With this configuration, if the head of the specific pattern such as a sequence block is detected in the input signal, the error rate measurement apparatus according to the present invention displays that the specific pattern is detected, on the display unit. Therefore, the error rate measurement apparatus according to the present invention can detect the specific pattern such as the sequence block in real time, and notify a user of the detected specific pattern.

That is, since the present invention has configuration in which a detection function of a sequence block such as PCIe or USB is added to the error rate measurement apparatus capable of measuring an error rate in real time, the user can check the presence of a specific sequence block instantaneously without taking time for analysis, and usability can be improved.

Further, the error rate measurement apparatus according to the present invention, the display unit may further display a holding release instruction unit (62) for releasing the holding of the detection signal by the latch unit.

With this configuration, in the error rate measurement apparatus according to the present invention, since the user operates the release instruction unit to release the holding of the detection signal by the latch unit, detection of a new specific pattern can be newly started.

Further, the error rate measurement apparatus according to the present invention, may further include: a delay circuit (27) that delays the input signal in which the head of the specific pattern is detected by the head detection unit to synchronize the internal signal output from the internal signal generation circuit with the specific pattern in the input signal; and an error rate measurement unit (28) that measures an error rate of the specific pattern in the input signal by sequentially comparing the internal signal output from the internal signal generation circuit with the input signal output from the delay circuit, in which the internal signal generation circuit may generate the internal signal by using the detection signal as a trigger.

With this configuration, the error rate measurement apparatus according to the present invention can synchronize the internal signal output from the internal signal generation circuit with the specific pattern in the input signal to measure the error rate of the specific pattern in the input signal.

In addition, the error rate measurement apparatus according to the present invention, may further include: a pulse pattern generator (21) that transmits a sequence block for causing the link state management mechanism to transition to a predetermined state, to the DUT.

With this configuration, since the error rate measurement apparatus according to the present invention includes the pulse pattern generator, it is possible to perform sending of the sequence block for measuring the error rate and a check of the operation, with one apparatus. Therefore, the error rate measurement apparatus according to the present invention can reduce a time and cost required for a test process related to the error rate measurement, and can improve efficiency of the test process.

Further, according to the present invention, there is provided a signal detection method executed by an error rate measurement apparatus (100) for measuring an error rate of an input signal from a device under test (DUT) (200), the method including: an internal signal generation step (S3) of generating an internal signal consisting of a specific pattern expected to be output from the DUT according to a state of a link state management mechanism;

- a reference signal holding step (S4) of holding a part of a head of the internal signal as a reference signal; a head detection step (S6) of detecting a head of the specific pattern in the input signal by comparing the reference signal with the input signal; a detection signal output step (S7) of outputting a detection signal synchronized with a timing at which the head of the specific pattern is detected in the head detection step; a latch step (S8) of holding the detection signal by a latch unit (26); and a display step (S9) of displaying a detection notification image (61) indicating that the head of the specific pattern is detected in the head detection step, during a period in which the detection signal is held by the latch unit.

Further, in the signal detection method according to the present invention, in the display step, a holding release instruction unit (62) for releasing the holding of the detection signal by the latch unit may be further displayed.

Further, in the signal detection method according to the present invention, the input signal in which the head of the specific pattern is detected in the head detection step may be delayed to synchronize the internal signal output in the internal signal generation step with the specific pattern in the input signal, an error rate of the specific pattern in the input signal may be measured by sequentially comparing the internal signal output in the internal signal generation step with the input signal, and in the internal signal generation step, the internal signal may be generated by using the detection signal as a trigger.

Further, in the signal detection method according to the present invention, a sequence block for causing the link state management mechanism to transition to a predetermined state may be transmitted to the DUT.

Further, in the signal detection method according to the present invention, a sequence block for causing the link state management mechanism to transition to a predetermined state may be transmitted to the DUT.

Advantage of the Invention

The present invention provides an error rate measurement apparatus and a signal detection method capable of detecting a specific pattern such as a sequence block in real time, and notifying a user of the detected specific pattern.

BEST MODE FOR CARRYING OUT THE INVENTION

Hereinafter, embodiments of an error rate measurement apparatus and a signal detection method according to the present invention will be described with reference to the drawings.

Figure 1:
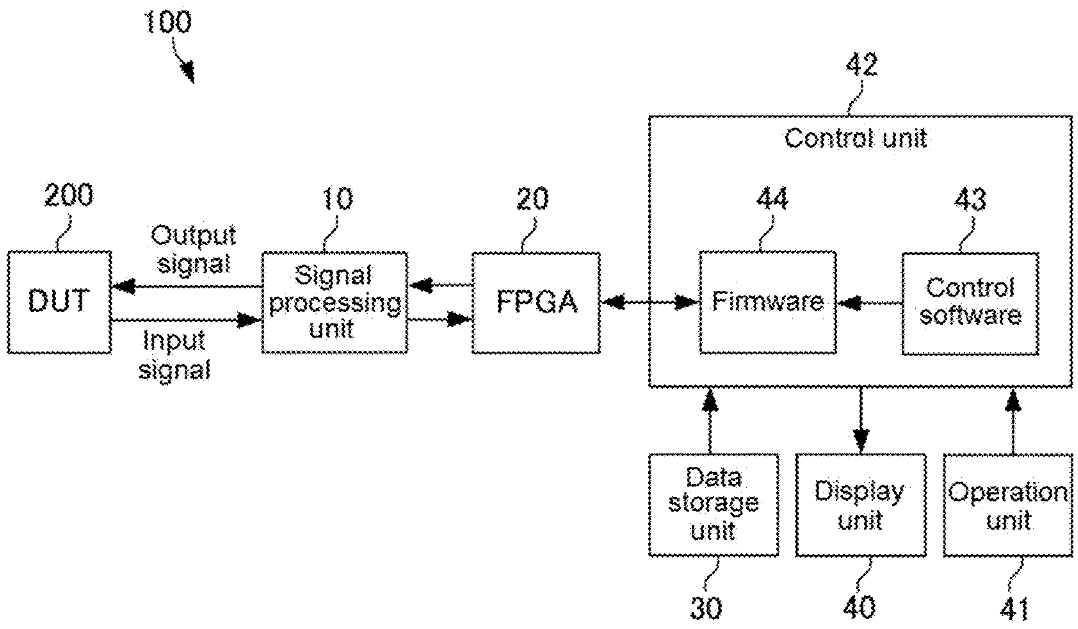
FIG. 1 is a block diagram illustrating a configuration of an error rate measurement apparatus according to an embodiment of the present invention.

As illustrated in FIG. 1, an error rate measurement apparatus 100 according to the present embodiment measures an error rate of an input signal from a device under test (DUT) 200, and includes a signal processing unit 10, an FPGA 20, a data storage unit 30, a display unit 40, an operation unit 41, and a control unit 42.

The control unit 42 is configured with a control device such as a computer including, for example, a central processing unit (CPU), a graphics processing unit (GPU), a read only memory (ROM), a random access memory (RAM), and a hard disk drive (HDD), and is configured to control the display unit 40 and the operation unit 41 and to control the FPGA 20 by a control software 43.

In addition, the control unit 42 is equipped with firmware 44 for mediating the FPGA 20 and the control software 43. The control software 43 has a GUI, and performs a process on an input from a user in the operation unit 41, and a process of a display to the user in the display unit 40.

The display unit 40 is configured with various display screens, a display device such as a liquid crystal display (LCD) that displays a GUI such as a soft key, and the like.

The operation unit 41 is for accepting an operation input by the user, and is configured with, for example, an operation knob, various keys, a switch, a button, or user interface such as a touch panel, a mouse, or a keyboard for operating the GUI of the display unit 40, which are provided in a main body of the error rate measurement apparatus 100.

Figure 6:
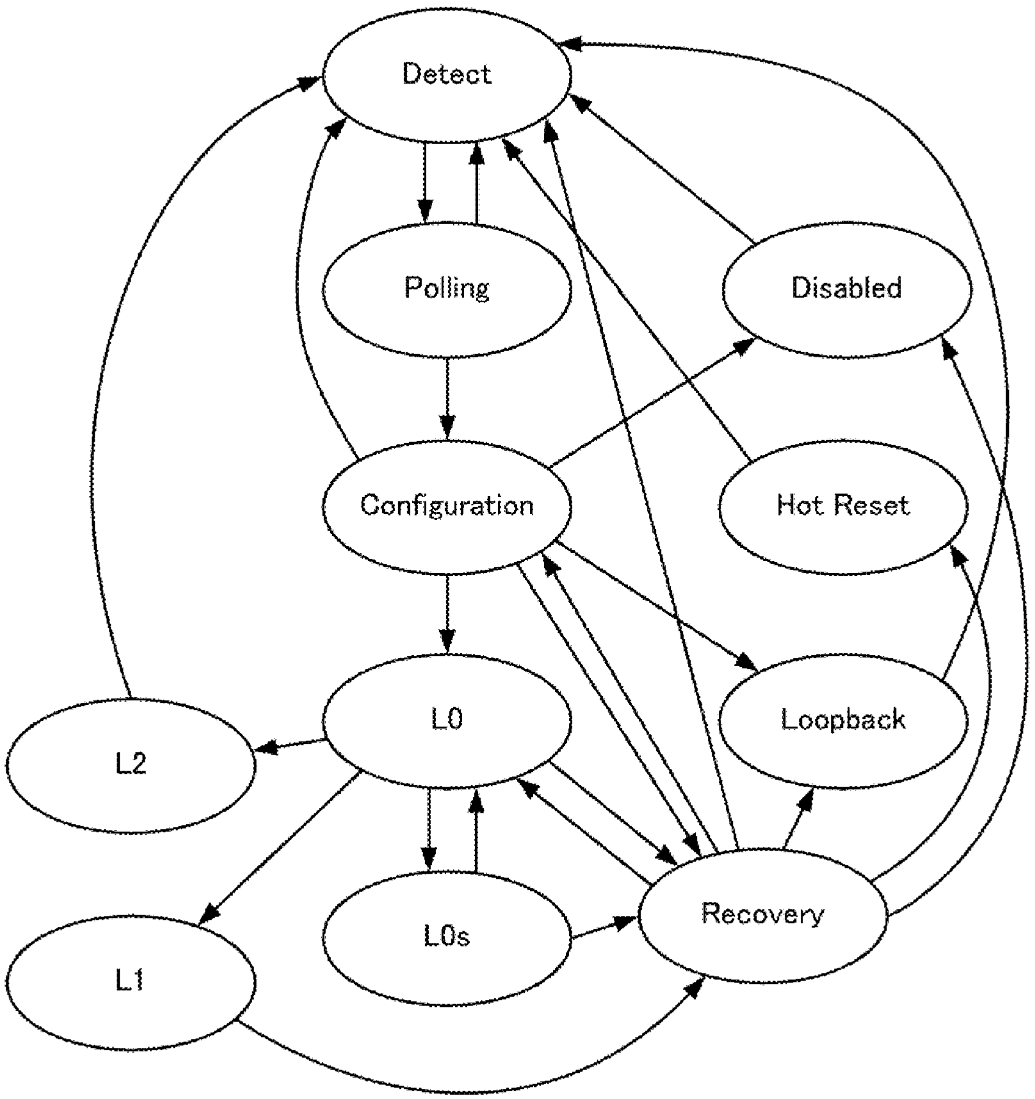
FIG. 6 PRIOR ART
FIG. 6 is a diagram illustrating a state transition of an LTSSM.

The DUT 200 is equipped with the LTSSM, and in, for example, a state in which the LTSSM transitions to each state as illustrated in FIG. 6, a data pattern such as a sequence block corresponding to the state is output as an input signal of the error rate measurement apparatus 100. For example, in a state in which the DUT 200 transitions to a "LOOPBACK_ACTIVE_MASTER" of a loopback state, the DUT 200 outputs (folds) an output signal from a pulse pattern generator (PPG) 21, which will be described below, as an input signal of the error rate measurement apparatus 100. Examples of a standard corresponding to the DUT 200 include PCIe Gen 1 to 6, USB 1.0 to 4, and the like.

The signal processing unit 10 converts an input signal from the DUT 200 from an analog signal into a digital signal, and converts an output signal from the FPGA 20 from a digital signal into an analog signal.

The data storage unit 30 is configured with a memory such as a RAM, and stores a specific pattern that is expected to be output from the DUT 200 in a state in which the LTSSM of the DUT 200 transitions to various states. In addition, the data storage unit 30 stores the specific pattern in advance in file units.

The specific pattern is, for example, a sequence block that controls a state transition between a plurality of states managed by the LTSSM of the DUT 200. The data storage unit 30 stores a known sequence block output when the DUT 200 transitions to each state in advance in file units.

For example, in a case where a standard is PCIe Gen5 and a state of the DUT 200 is "LOOPBACK_ENTRY_MASTER_TS1", a sequence block output from the DUT 200 is recorded in a file having a file name of "PCIe5_LOOPBACK_ENTRY_MASTER_TS1". A method of assigning the file name is not limited to the above, and the file name may have various names, which are easy for the user to understand a combination of the standard and the state.

Alternatively, the specific pattern may be a pseudo random binary sequence (PRBS) pattern, various data patterns set by the user, or the like.

For example, in a case where the state of the DUT 200 is "LOOPBACK_ACTIVE_MASTER", the data storage unit 30 may store information for generating a known pattern such as a PRBS pattern or various data patterns set by the user, in the PPG 21 and an internal signal generation circuit 22 to be described below, in file units.

Figure 2:
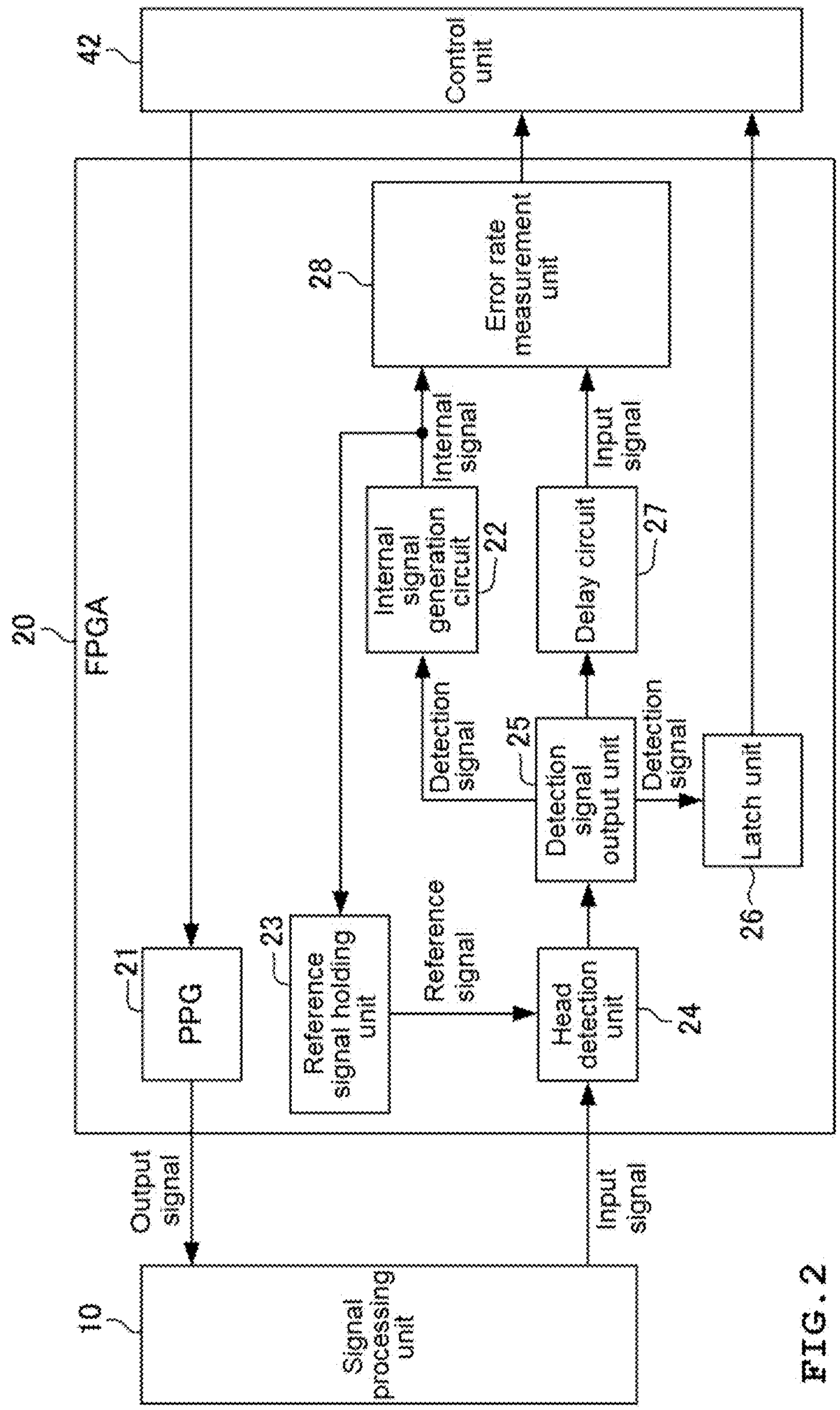
FIG. 2 is a block diagram illustrating a functional configuration of an FPGA provided in the error rate measurement apparatus according to the embodiment of the present invention.

As illustrated in FIG. 2, the FPGA 20 includes the PPG 21, an internal signal generation circuit 22, a reference signal holding unit 23, a head detection unit 24, a detection signal output unit 25, a latch unit 26, a delay circuit 27, and an error rate measurement unit 28.

The PPG 21 transmits, as an output signal, a sequence block for causing the LTSSM of the DUT 200 to transition to various states, to the DUT 200. In addition, in a case where the state of the DUT 200 is "LOOPBACK_ACTIVE_MASTER", the PPG 21 reads out data of a specific pattern stored in the data storage unit 30 from the data storage unit 30, performs an encoding process or the like on the read data of the specific pattern as appropriate, generates a test signal obtained by repeating the specific pattern, and transmits the test signal to the DUT 200 as the output signal. The specific pattern read out from the data storage unit 30 by the PPG 21 is set on a pattern setting screen 70 to be described below.

The internal signal generation circuit 22 is circuit that reads out data of a specific pattern expected to be output from the DUT 200 according to the state of the LTSSM of the DUT 200 from the data storage unit 30, performs an encoding process or the like on the read data of the specific pattern as appropriate, and generates an internal signal obtained by repeating the specific pattern. The specific pattern read out from the data storage unit 30 by the internal signal generation circuit 22 is set on a pattern setting screen 70 to be described below.

The internal signal generation circuit 22 generates an internal signal by using, as a trigger, a detection signal output from the detection signal output unit 25, which will be described below, and outputs the generated internal signal to the error rate measurement unit 28 in a rear stage.

In a case where the state of the DUT 200 is "LOOPBACK_ACTIVE_MASTER", the control unit 42 performs control of causing the PPG 21 and the internal signal generation circuit 22 to generate the same specific pattern.

The reference signal holding unit 23 holds a part of a head of the internal signal consisting of the specific pattern set on the pattern setting screen 70 to be described below, for example, several tens of bits of the head of the specific pattern, as a reference signal.

The head detection unit 24 compares the reference signal held by the reference signal holding unit 23 with an input signal from the DUT 200, on which a signal process is performed by the signal processing unit 10, to detect a head of a specific pattern in the input signal.

The detection signal output unit 25 outputs a detection signal synchronized with a timing at which the head of the specific pattern is detected by the head detection unit 24 to the internal signal generation circuit 22. In addition, the detection signal output unit 25 outputs a pattern of the input signal in which the head of the specific pattern is detected by the head detection unit 24 to the delay circuit 27.

The latch unit 26 holds the detection signal output from the detection signal output unit 25. In a case where an error rate measured by the error rate measurement unit 28, which will be described below, exceeds a predetermined value, the latch unit 26 releases the held detection signal. This is because there is a case where the same data as the head of the specific pattern is included in a location different from the specific pattern of the input signal. In such a case, since subsequent bits of the input signal do not coincide with the specific pattern, a value indicating a high error rate is obtained.

In addition, the latch unit 26 releases the held detection signal even when a button 62 of "History Reset" is pressed on a result display screen 60 to be described below. After the detection signal held by the latch unit 26 is released, the head detection unit 24 detects a head of a specific pattern included in the input signal again.

The delay circuit 27 is a circuit that delays the input signal in which the head of the specific pattern is detected by the head detection unit 24 to synchronize the internal signal output from the internal signal generation circuit 22 with the specific pattern in the input signal.

That is, the internal signal generation circuit 22 generates an internal signal by using the detection signal as a trigger, and the delay circuit 27 delays the input signal in which the head of the specific pattern is detected, so that the internal signal synchronized with the input signal is output to the error rate measurement unit 28 in the rear stage.

The error rate measurement unit 28 sequentially compares the internal signal output from the internal signal generation circuit 22 with the input signal output from the delay circuit 27 to measure an error rate of the specific pattern in the input signal. The error rate in the present embodiment is a bit error rate (BER) in a case where the input signal is a non-return to zero (NRZ) type signal, and is a symbol error rate (SER) in a case where the input signal is a pulse amplitude modulation 4 (PAM4) type signal.

Figure 3:
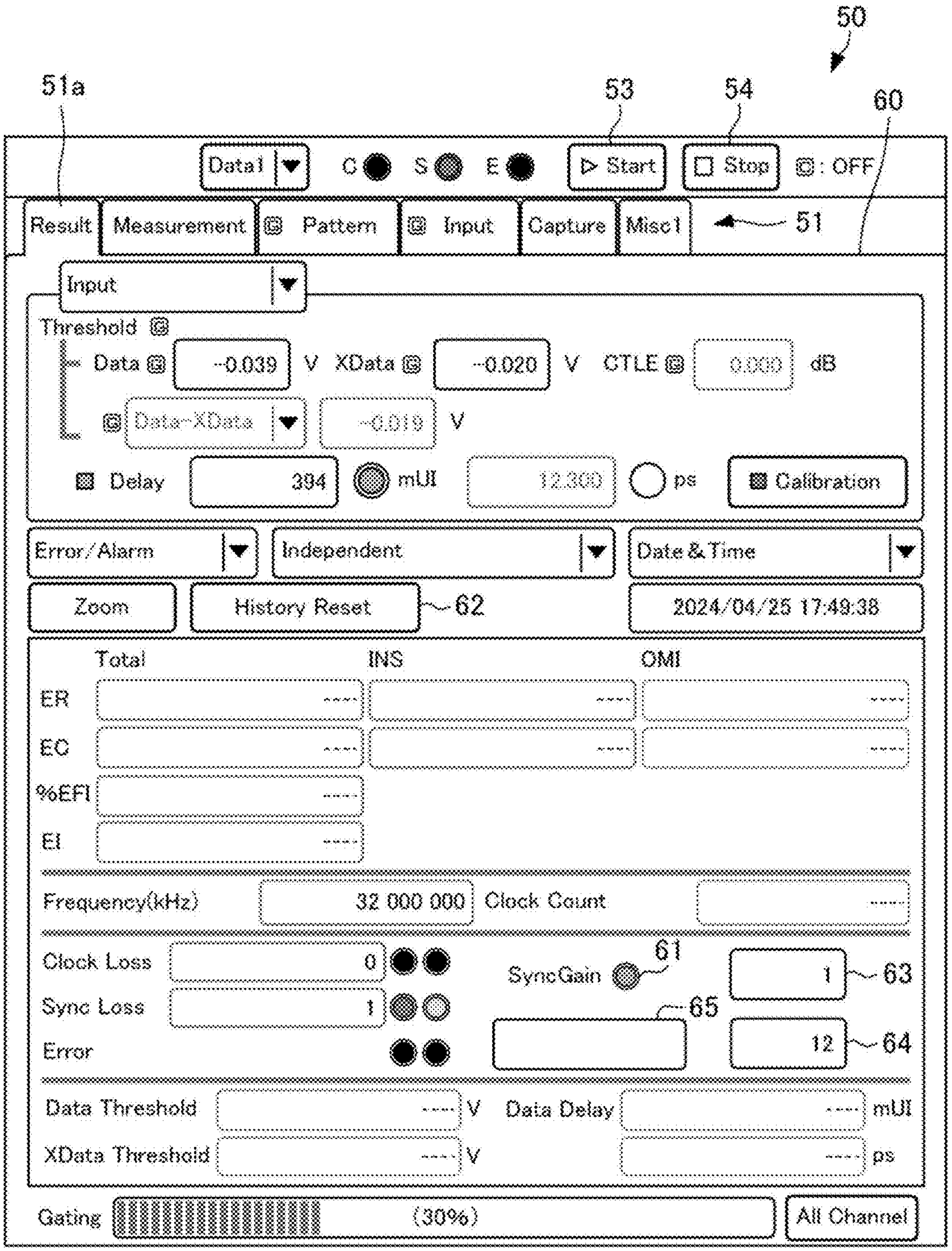
FIG. 3 is a diagram illustrating an example of a result display screen displayed on a display unit provided in the error rate measurement apparatus according to the embodiment of the present invention.

FIG. 3 illustrates the result display screen 60 displayed by the display unit 40 in a case where a "Result" tab 51*a* is pressed by the operation unit 41 in a screen selection tab 51 on a main display screen 50 displayed by the display unit 40.

The result display screen 60 includes an image 61 of "SyncGain", the button 62 of "History Reset", and a text box 63.

The image (hereinafter, also referred to as a "detection notification image") 61 of "SyncGain" on the result display screen 60 is an image resembling an LED.

In the detection notification image 61, in a case where a head of a specific pattern set on the pattern setting screen 70 to be described below is continuously detected the number of times of detection set in the text box 63, the detection notification image 61 is changed from a light-off state in black to a light-on state in green. Here, the text box 63 is for setting the number of times of detection from the light-off state to the light-on state of the detection notification image 61, and is disposed, for example, in the vicinity of the detection notification image 61 on the result display screen 60.

If the button 62 of "History Reset" is pressed by the operation unit 41, the detection notification image 61 is in the light-off state in black, and in this case, a detection signal held by the latch unit 26 is released. The button 62 of "History Reset" constitutes a holding release instruction unit for releasing the holding of the detection signal by the latch unit 26.

That is, the detection notification image 61 indicates that the head of the specific pattern is detected by the head detection unit 24 with a light-on state in green, during a period in which the detection signal is held by the latch unit 26. A color of the detection notification image 61 is not limited to the black and green described above, and may be a combination of various colors.

In addition, the release of the holding of the detection signal by the latch unit 26 can be controlled not only by pressing the button 62 of the operation unit 41 of "History Reset" but also by using a remote command from an external control device.

Further, the result display screen 60 may have a text box 64 indicating the number of times of detection indicating how many times the detection signal is continuously detected by the latch unit 26 in the vicinity of the detection notification image 61.

Further, in the detection notification image 61, when an error rate of the specific pattern measured by the error rate measurement unit 28 falls below a predetermined error rate in a period in which the detection signal is held by the latch unit 26, the detection notification image 61 may be changed from the light-off state in black to the light-on state in green. Therefore, there is an advantage that a reliability of the detection of the specific pattern can be increased. For this purpose, the result display screen 60 may include a text box 65 for setting the predetermined error rate for setting the detection notification image 61 in the light-on state in green.

Depending on an error rate set in the text box 65, a time from when the detection signal is held by the latch unit 26 to when the detection notification image 61 is in the light-on state in green may exceed 1 ms (for example, minimum 1E9 bits of data are required to check that the error rate is 1E-9 or less).

The error rate measurement apparatus 100 according to the present embodiment detects, for example, a sequence block of 1 ms or more in practice, and the synchronization by the delay circuit 27 is completed within several tens to several hundreds of μs, which is 1 ms or less, from an input of an input signal from the DUT 200. This is a delay time from the input of the input signal to the synchronization. Meanwhile, since a notification method to the final user is the display on the GUI of the display unit 40, an update cycle of the GUI of the display unit 40 is actually the final delay time.

Figure 4:
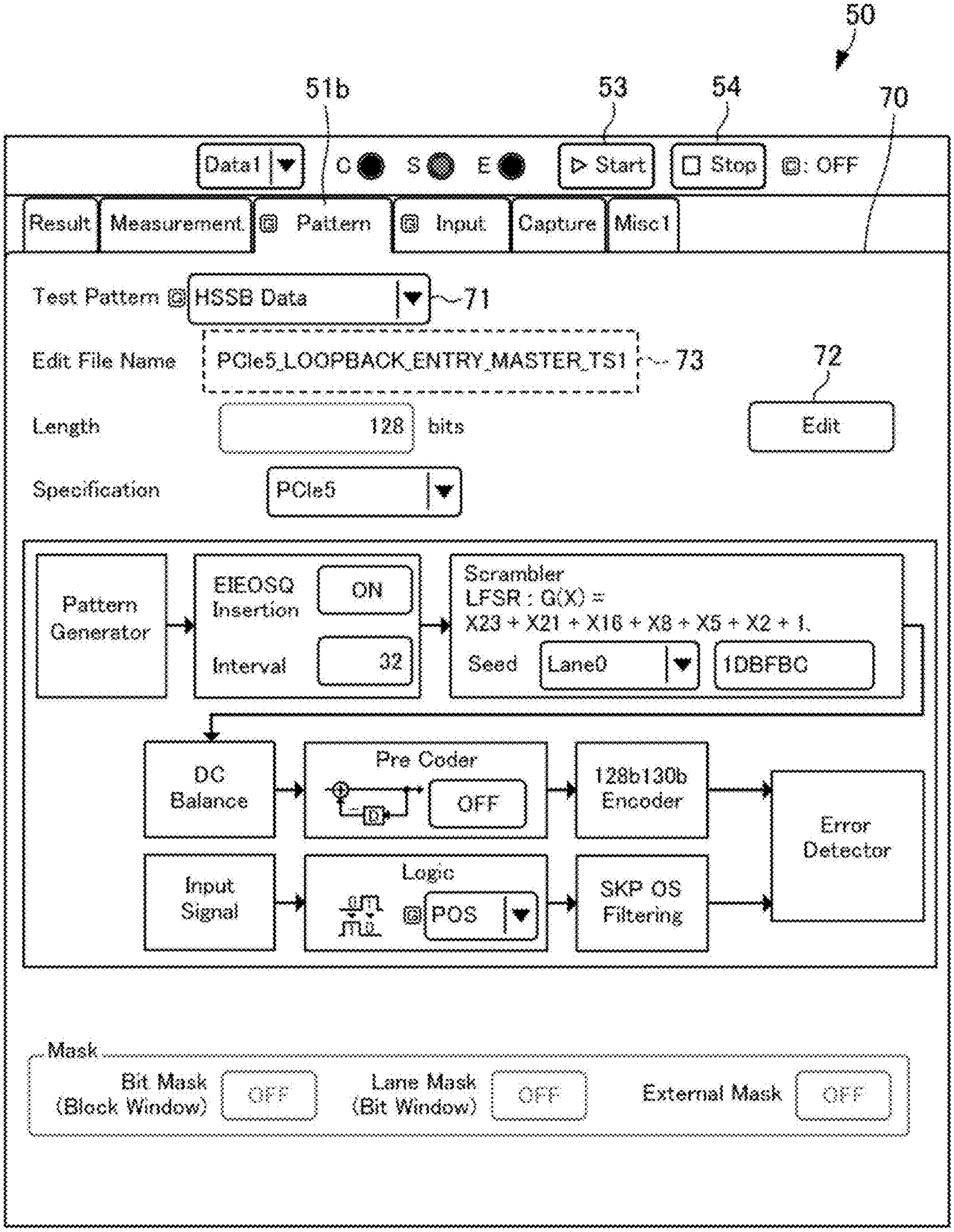
FIG. 4 is a diagram illustrating an example of a pattern setting screen displayed on the display unit provided in the error rate measurement apparatus according to the embodiment of the present invention.

FIG. 4 illustrates the pattern setting screen 70 displayed when a "Pattern" tab 51*b* is pressed by the operation unit 41, in the screen selection tab 51 on the main display screen 50 of the display unit 40.

The pattern setting screen 70 is a screen for setting a specific pattern, and includes a pull-down menu 71 of "Test Pattern", an Edit button 72, and a label 73 of "Edit File Name".

In the pull-down menu 71 of "Test Pattern", for example, a sequence block, a PRBS pattern, various data patterns, and the like can be selected by the operation unit 41, as the specific pattern. FIG. 4 illustrates a state in which "HSSB Data" indicating data of the sequence block is selected.

The Edit button 72 is for designating a file in which the specific pattern selected in the pull-down menu 71 of "Test Pattern" is recorded from among a plurality of files stored in the data storage unit 30. By the Edit button 72 being pressed by the operation unit 41, a different screen (not illustrated) is opened, and it is possible to read and save a file, edit the file in units of bits, and the like.

The label 73 of "Edit File Name" is for displaying a file name of the file designated by the Edit button 72 among the plurality of files stored in the data storage unit 30. That is, the specific pattern recorded in the file displayed here is set in the PPG 21 and the internal signal generation circuit 22. FIG. 4 illustrates a state in which a file name "PCIe5_LOOPBACK_ENTRY_MASTER_TS1" is displayed.

As illustrated in FIGS. 3 and 4, the main display screen 50 includes a measurement start button 53 for designating a measurement start and a measurement stop button 54 for designating a measurement stop.

If the measurement start button 53 is pressed by the operation unit 41, the PPG 21 sequentially outputs a sequence block that controls a state transition of the DUT 200, to the DUT 200. Thereafter, if the DUT 200 sequentially performs the state transition and outputs the specific pattern recorded in the file displayed on the label 73 of "Edit File Name", the head detection unit 24 detects a head of the specific pattern, and the detection signal output unit 25 outputs a detection signal.

For example, as illustrated in FIG. 4, in a case where "HSSB Data" is selected in the pull-down menu 71 of "Test Pattern" and "PCIe5_LOOPBACK_ENTRY_MASTER_TS1" is designated in the label 73 of "Edit File Name", the DUT 200 reaches a state of "LOOPBACK_ENTRY_MASTER_TS1" of PCIe Gen5, and outputs a sequence block of this state. In this case, the head detection unit 24 detects a head of the sequence block, and the detection signal output unit 25 outputs a detection signal.

Figure 5:
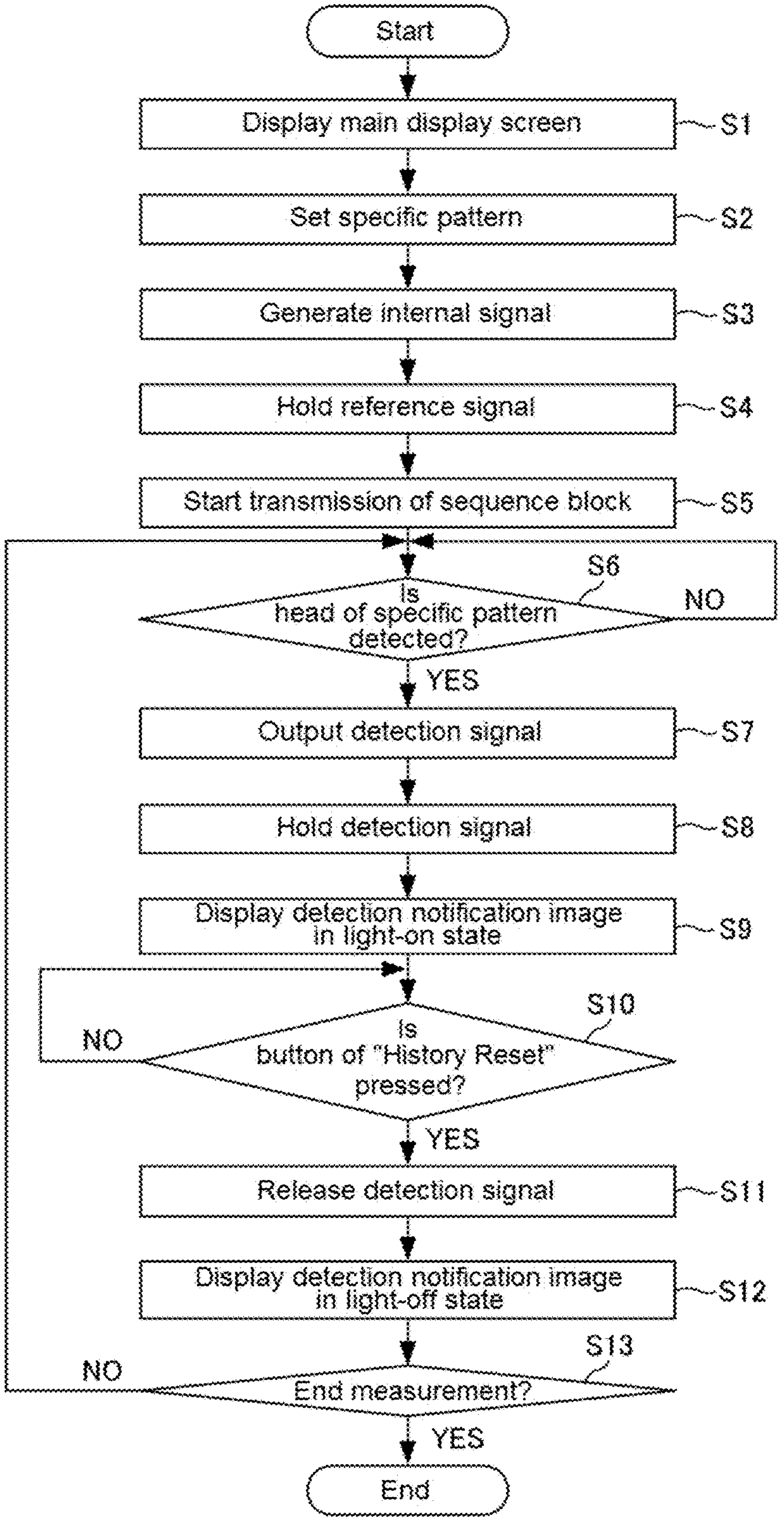
FIG. 5 is a flowchart illustrating a process of a signal detection method using the error rate measurement apparatus according to the embodiment of the present invention.

Hereinafter, a signal detection method using the error rate measurement apparatus 100 of the present embodiment will be described with reference to the flowchart in FIG. 5 by using an example of the process. Duplicated description with the description of the configuration of the error rate measurement apparatus 100 will be appropriately omitted.

First, the control unit 42 displays the main display screen 50 on the display unit 40 (step S1).

Next, a user sets a specific pattern as a detection target by selecting, for example, a file having a file name of "PCIe5_LOOPBACK_ENTRY_MASTER_TS1" on the pattern setting screen 70 via the operation unit 41 (step S2).

Next, in a case where the user presses the measurement start button 53 via the operation unit 41, the internal signal generation circuit 22 generates an internal signal consisting of a sequence block, which is a specific pattern recorded in a file of "PCIe5_LOOPBACK_ENTRY_MASTER_TS1" (internal signal generation step S3).

Next, the reference signal holding unit 23 holds a part of a head of the sequence block recorded in the file of "PCIe5_LOOPBACK_ENTRY_MASTER_TS1" as a reference signal (reference signal holding step S4).

Next, the PPG 21 sequentially transmits the sequence block for controlling a state transition, to the DUT 200 (step S5).

Next, in a case where the head detection unit 24 compares the reference signal with an input signal from the DUT 200 to detect the head of the sequence block recorded in the file of "PCIe5_LOOPBACK_ENTRY_MASTER_TS1" in the input signal (YES in head detection step S6), the detection signal output unit 25 outputs a detection signal synchronized with a timing at which the head of the sequence block is detected in the head detection step S6, to the internal signal generation circuit 22 (detection signal output step S7).

Next, the latch unit 26 holds the detection signal output from the detection signal output unit 25 (latch step S8).

Next, the display unit 40 changes the detection notification image 61 from a light-off state to a light-on state in the result display screen 60 during a period in which the detection signal is held by the latch unit 26, and indicates that the head of the specific pattern is detected by the head detection step S6 (display step S9).

Next, if the user presses the button 62 of "History Reset" via the operation unit 41 (YES in step S10), the latch unit 26 releases the holding of the detection signal (step S11).

Next, the display unit 40 changes the detection notification image 61 from the light-on state to the light-off state on the result display screen 60 (step S12).

Next, if the user presses the measurement stop button 54 via the operation unit 41 (YES in step S13), the process of the present flowchart is ended. On the other hand, if the user does not press the measurement stop button 54 via the operation unit 41 (NO in step S13), the processes in step S6 and subsequent steps are executed again.

As described above, in the error rate measurement apparatus 100 according to the present embodiment, if the head of the specific pattern such as the sequence block is detected in the input signal, the display unit 40 displays that the specific pattern is detected. Therefore, the error rate measurement apparatus 100 according to the present embodiment can detect a specific pattern such as a sequence block in real time, and notify the user of the detected specific pattern.

That is, since the present invention has configuration in which a detection function of a sequence block such as PCIe or USB is added to the error rate measurement apparatus capable of measuring an error rate in real time, the user can check the presence of a specific sequence block instantaneously without taking time for analysis, and usability can be improved.

In addition, in the error rate measurement apparatus 100 according to the present embodiment, the user presses the button 62 of "History Reset" as the release instruction unit, so that the holding of the detection signal by the latch unit 26 is released, and thus, the detection of the new specific pattern can be started.

In addition, the error rate measurement apparatus 100 according to the present embodiment can synchronize the internal signal output from the internal signal generation circuit 22 with the specific pattern in the input signal to measure the error rate of the specific pattern in the input signal.

In addition, since the error rate measurement apparatus 100 according to the present embodiment includes the pulse pattern generator 21, it is possible to perform sending of the sequence block for the error rate measurement and a check of the operation with one apparatus. Therefore, the error rate measurement apparatus 100 according to the present embodiment can reduce a time and cost required for a test process related to the error rate measurement, and can improve efficiency of the test process.

DESCRIPTION OF REFERENCE NUMERALS AND SIGNS

20: FPGA
21: PPG
22: internal signal generation circuit
23: reference signal holding unit
24: head detection unit
25: detection signal output unit
26: latch unit
27: delay circuit
28: error rate measurement unit
30: data storage unit
40: display unit
41: operation unit
42: control unit
43: control software
44: firmware
50: main display screen
60: result display screen
61: detection notification image
62: button
63 to 65: text box
70: pattern setting screen
71: pull-down menu
72: edit button
73: label
100: error rate measurement apparatus
200: DUT

What is claimed is:

1. An error rate measurement apparatus for measuring an error rate of an input signal from a device under test (DUT), the error rate measurement apparatus comprising:

a display;

a field-programmable gate array (FPGA) configured to:

generate an internal signal consisting of a specific pattern expected to be output from the DUT according to a state of a link state management mechanism;

hold a part of a head of the internal signal as a reference signal;

detect a head of the specific pattern in the input signal by comparing the reference signal with the input signal;

output a detection signal synchronized with a timing at which the head of the specific pattern is detected; and hold the detection signal; and a controller that causes the display to display a detection notification image indicating that the head of the specific pattern is detected, during a period in which the detection signal is held.

2. The error rate measurement apparatus according to claim 1, wherein the display further displays a holding release instruction button for releasing the holding of the detection signal.

3. The error rate measurement apparatus according to claim 2, wherein the FPGA is further configured to:

transmit a sequence block for causing the link state management mechanism to transition to a predetermined state, to the DUT.

4. The error rate measurement apparatus according to claim 1, wherein the FPGA is further configured to:

delay the input signal in which the head of the specific pattern is detected to synchronize the internal signal with the specific pattern in the input signal; and measure an error rate of the specific pattern in the input signal by sequentially comparing the internal signal output from the internal signal generation circuit with the input signal output from the delay circuit, wherein the internal signal generation circuit generates the internal signal by using the detection signal as a trigger.

5. The error rate measurement apparatus according to claim 1, wherein the FPGA is further configured to:

transmit a sequence block for causing the link state management mechanism to transition to a predetermined state, to the DUT.

6. A signal detection method executed by an error rate measurement apparatus for measuring an error rate of an input signal from a device under test (DUT), the method comprising:

generating an internal signal consisting of a specific pattern expected to be output from the DUT according to a state of a link state management mechanism;

holding a part of a head of the internal signal as a reference signal;

detecting a head of the specific pattern in the input signal by comparing the reference signal with the input signal;

outputting a detection signal synchronized with a timing at which the head of the specific pattern is detected in the detecting;

holding the detection signal; and displaying a detection notification image indicating that the head of the specific pattern is detected in the detecting, during a period in which the detection signal is held in the holding of the detection signal.

7. The signal detection method according to claim 6, wherein in the displaying, a holding release instruction button for releasing the holding of the detection signal is further displayed.

8. The signal detection method according to claim 7, wherein a sequence block for causing the link state management mechanism to transition to a predetermined state is transmitted to the DUT.

9. The signal detection method according to claim 6, wherein the input signal in which the head of the specific pattern is detected in the detecting is delayed to synchronize the internal signal output in the generating of the internal signal with the specific pattern in the input signal, an error rate of the specific pattern in the input signal is measured by sequentially comparing the internal signal output in the generating of the internal signal with the input signal, and in the generating of the internal signal, the internal signal is generated by using the detection signal as a trigger.

10. The signal detection method according to claim 6, wherein a sequence block for causing the link state management mechanism to transition to a predetermined state is transmitted to the DUT.

* * * * *